L. BLOCK.
DISINFECTING AND ADVERTISING DEVICE FOR TELEPHONES AND THE LIKE.
APPLICATION FILED MAY 3, 1916.
1,228,394.
Patented June 5, 1917.
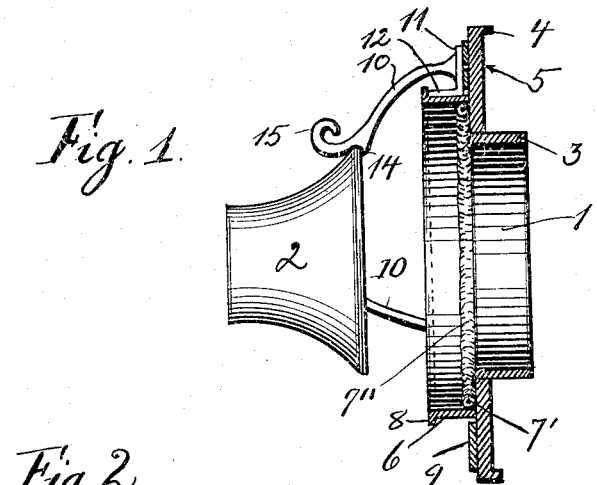
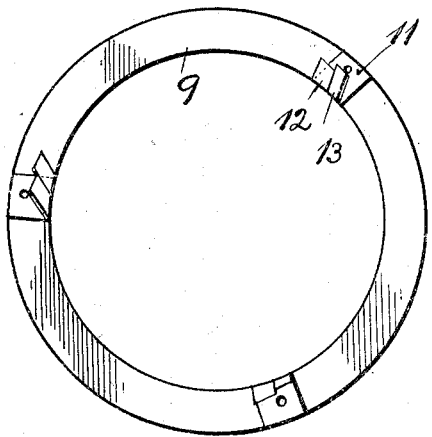
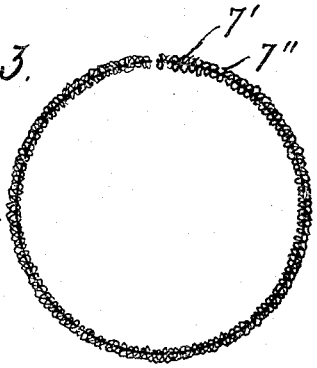
INVENTOR
Louis Block
ATTORNEY.

UNITED STATES PATENT OFFICE.

LOUIS BLOCK, OF BROOKLYN, NEW YORK, ASSIGNOR TO (MRS.) MINNIE FRANKL, OF NEW YORK, N. Y.

DISINFECTING AND ADVERTISING DEVICE FOR TELEPHONES AND THE LIKE.

1,228,394.

Specification of Letters Patent.   Patented June 5, 1917.

Application filed May 3, 1916.   Serial No. 95,077.

*To all whom it may concern:*

Be it known that I, LOUIS BLOCK, a citizen of the United States, residing at Brooklyn, in the county of Kings and State of New York, have invented certain new and useful Improvements in Disinfecting and Advertising Devices for Telephones and the like, of which the following is a specification.

My invention consists in an attachment for telephones and the like constituting, at the same time, a disinfecting device for the mouthpiece and also an advertising medium. The object of my invention is to make such an attachment of few parts, neat and attractive in appearance adapted to be easily placed on any mouthpiece and just as readily removed therefrom, compact, durable and useful to the subscriber.

The new device comprises only three parts, viz. the main part preferably circular in contour and adapted to receive an annular advertising card, the disinfecting device, and the attaching member.

My invention will be more fully described in connection with the accompanying drawing and the novel features will be pointed out in the claims.

In the drawing, Figure 1 is a central section through my new device showing it attached to the mouthpiece of a telephone; Fig. 2 shows the ring-portion of the attaching member, the braces shown in Fig. 1 having been omitted; Fig. 3 shows the disinfecting device.

The main part, as a whole, is designated by the numeral 1, and is preferably of circular shape. It may be made of hard rubber, celluloid, or any other suitable material. As seen from the drawing, it has a large circular opening of about the same diameter as the flared end of the mouthpiece 2, to which the device is attached. It is provided with an outwardly extending portion 3, which forms also a sort of a mouthpiece in line with the mouthpiece 2. Along the outer edge runs a narrow raised rim 4 forming with the radial portion 3 a shallow groove 5 adapted to receive an annular card containing advertising matter.

Toward the mouthpiece 2 there projects radially from the main part 1 an annular portion 6 at a little distance from the inner edge of the circular opening, thus forming a receding space adapted to receive the disinfecting member 7. The latter, as shown in Fig. 3 consists of a piece of spring wire 7' bent so as to form a circle, and having wound around it some absorbent material 7" which, before the wire is placed within the said space (Fig. 1) is saturated with a liquid disinfectant. The wire 7' being elastic, it will be readily seen, that the disinfecting device is thus firmly held in place by the fact that the wire tends to spread. This, therefore, constitutes a very simple disinfecting device, which can be readily put in place and exchanged.

To return now to the main part 1, the annular portion 6 is provided at its outer edge with a narrow lateral flange 8, the purpose of which will be presently explained.

For placing the device on the mouthpiece 2 the attaching part above referred to is provided. This part comprises a flat ring 9 shown in Fig. 2, a number of legs or braces 10 fastened therein and a corresponding number of lugs 11, also shown in Fig. 2. These lugs 11 are preferably soldered to the ring 9. The latter has an inner diameter large enough to enable it to be passed over the narrow flange 8 on the annular portion 6 of the main part 1. As will be seen from Fig. 2 the free ends of the lugs 11 are split to form two resilient clips, a shorter one 12, and a longer one, 13. As the ring 9 is passed over the annular portion 6 to rest against the under side of the main part 1, the shorter clip 12 of each lug 11 will snap in behind the narrow flange 8 of annular portion 6, whereas the longer clip 13 will enter a notch formed by a small portion of the said flange 8 being cut away. The object of this arrangement is to prevent by means of the shorter clip 12 the ring 9 from being withdrawn whereas by means of the longer clip 13, the rotation of the ring 9 relative to the main part, is prevented, so that after the ring 9 has once been put in place, it is immovably held in position.

At the places of the lugs 11 the braces 10 are fastened to the ring 9, preferably by being riveted thereto. As will be seen from Fig. 1 the braces are curved inwardly and near their ends are provided each with a spur 14, adapted to sit on the edge of the mouthpiece 2. The braces—preferably three in number—are somewhat elastic permitting the device to be readily placed on the said mouthpiece. While the device is held securely in place by the braces 10, yet it can be turned around on the edge of the mouthpiece so that the circular advertising card (not shown) placed in the shallow groove 5 of part 1 can be conveniently read.

Beyond the edge of the mouthpiece the ends of the braces 10 are curved outwardly to form a small hook. From the hook of the brace occupying the lowest position, when the device is placed on the mouthpiece, a pencil, a small writing pad, or the like can be suspended for the convenient use of the subscriber.

It is self understood that the device herein shown and described illustrates only one embodiment of my invention and that changes or modifications can be made still coming within the range of my invention.

What I claim is:

1. In combination with the mouthpiece of a telephone, a disinfecting and advertising device comprising a main part having a circular opening to correspond with the opening of said mouthpiece and a receding inwardly projecting portion, a disinfecting medium frictionally held therein, a flat ring loosely bearing against said main portion and having lugs fastened thereto, each lug being provided with two resilient clips, one adapted to abut against a flange on said inwardly projecting portion and the other to enter a notch in said flange and curved braces fastened to said ring and shaped to rotatably hold the device on the edge of said mouthpiece.

2. In a disinfecting device for the mouthpiece of telephones and the like, a disinfecting medium comprising a thin elastic wire bent into circular shape so as to have a tendency to spread and covered with an absorbent material saturated with a liquid disinfectant.

3. In combination with the mouthpiece of a telephone, a disinfecting and advertising device comprising a main part having a circular opening to correspond with the opening of said mouthpiece and a receding inwardly projecting portion, a disinfecting medium elastically held therein, a ring loosely bearing against said main portion and curved braces fastened to said ring and shaped to rotatably hold the device on the edge of said mouthpiece said braces having hook-shaped ends adapted for the suspension therefrom of light articles.

In testimony whereof I affix my signature in presence of two witnesses.

LOUIS BLOCK.

Witnesses:
IRMA LASKER,
ALFRED MÜLLER.

Copies of this patent may be obtained for five cents each, by addressing the "Commissioner of Patents, Washington, D. C."